Oct. 20, 1953   F. C. FEHRMAN   2,655,725
ROTARY GRINDING IMPLEMENT
Filed Nov. 24, 1952
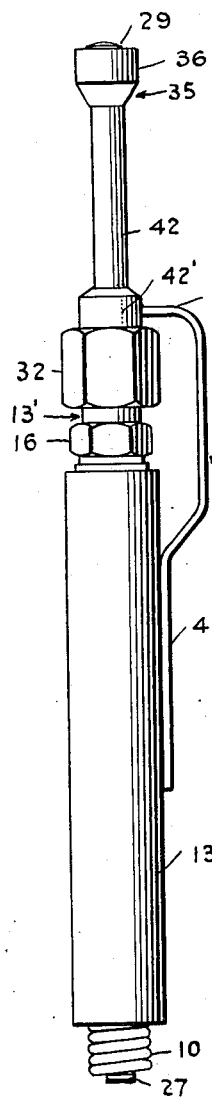
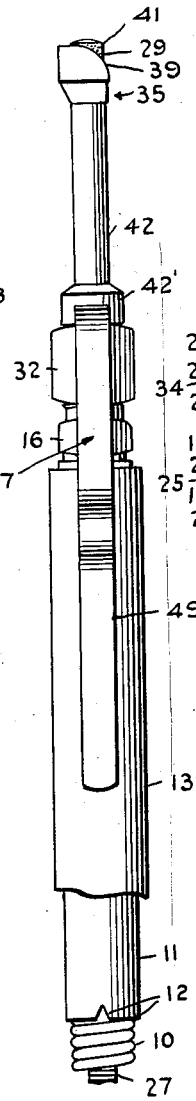
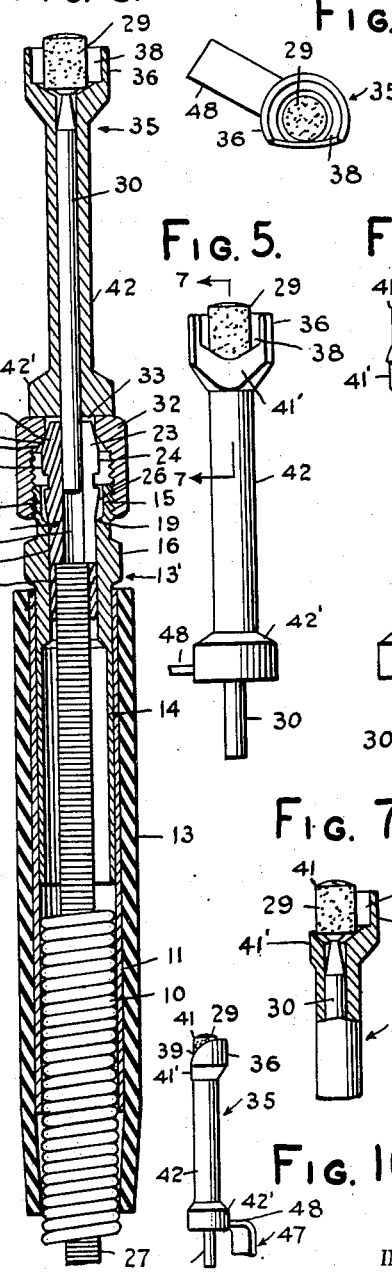
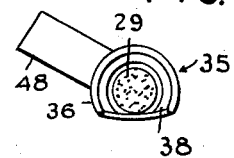
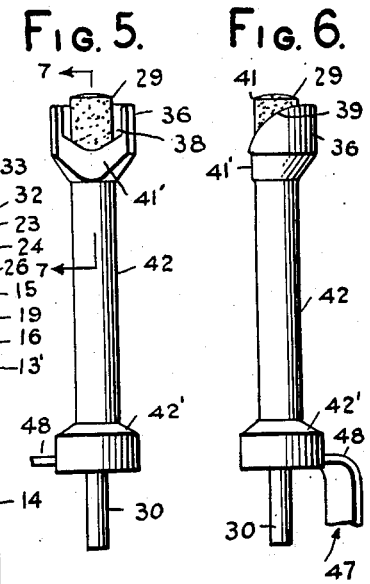
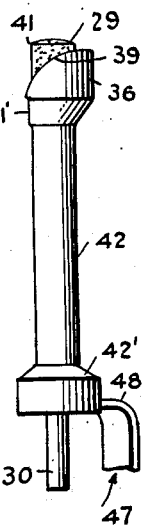
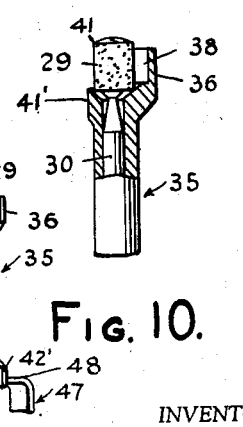
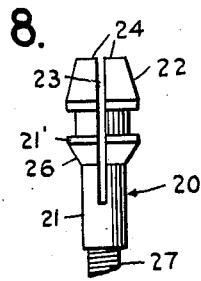
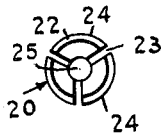
INVENTOR
FREDERICK C. FEHRMAN
BY
ATTORNEY Patented Oct. 20, 1953

2,655,725

UNITED STATES PATENT OFFICE 2,655,725

ROTARY GRINDING IMPLEMENT

Frederick C. Fehrman, Washington, D. C.

Application November 24, 1952, Serial No. 322,194

4 Claims. (Cl. 32—29)

1

My invention relates to a rotary grinding implement for use in caring for the teeth of small animals and the like.

A primary object of the invention is to provide a satisfactory grinding implement for the teeth or the tusks of small animals, particularly chinchillas, the instrument being characterized by extreme compactness and slenderness, so that it may be readily introduced into the chinchilla's mouth which is extremely small.

A further important object is to provide a rotary grinding implement of the above-mentioned character having a readily adjustable guard for the small rotary burr, for the purpose of preventing injury to the mouth of the animal while it tusks are being ground.

A further object is to provide an implement of the above-mentioned type, wherein the adjustable guard for the burr serves as a bearing for the spindle of the burr.

Still another object of the invention is to provide in a grinding implement of the above-mentioned character a rotary guard for the grinding burr which is adjustable about the entire circumference of the burr with the finger, while the implement is being held in the hand.

Other objects and advantages of the invention will be apparent during the course of the following description.

In the accompanying drawings, forming a part of this application, and in which like numerals are employed to designate like parts throughout the same, Figure 1 is a side elevation on a greatly enlarged scale of a rotary grinding implement embodying the invention, part broken away, Figure 2 is a further side elevation of the implement taken at right angles to Figure 1, Figure 3 is a further enlarged central vertical longitudinal section through the implement, Figure 4 is a plan view on an enlarged scale of an adjustable guard and associated elements removed, Figure 5 is a side elevation of the guard and associated elements, shown in Figure 4.

Figure 6 is a further side elevation of the guard taken at right angles to Figure 5, Figure 7 is an enlarged fragmentary vertical section on line 7—7 of Figure 5, Figure 8 is an enlarged fragmentary side elevation of a chuck and flexible drive shaft removed, Figure 9 is an end elevation of the chuck, and, Figure 10 is a side elevation of the guard and associated elements, and showing substantially the actual size of the implement,

2

In the drawings, where for the purpose of illustration is shown a preferred embodiment of the invention, the numeral 10 designates a flexible sheathing or tube of any suitable length, and formed from a continuous spirally wound wire coil or the like. One end of the flexible sheathing 10 engages in an end of a cylindrical thin walled rigid sleeve 11, of brass or the like, and the end of the sleeve receiving the sheathing 10 may be crimped inwardly as at 12 for firmly securing the sheathing 10 within the sleeve 11. As shown in Figure 3, the sheathing 10 terminates near the longitudinal center of the sleeve 11. The sleeve 11 is preferably covered throughout its entire length with a section of rubber tubing 13 or the like to facilitate handling the implement, and the rubber tubing section has a snug fit upon the rigid sleeve 11 and will not turn thereon. The sleeve 11 and tubing 13 constitute a handpiece.

Rotatably mounted within the end of the sleeve 11 remote from the sheathing 10 is an intermediate cylindrical sleeve or adapter 13', having a thin walled skirt portion 14 extending for a substantial distance into the sleeve 11 for forming an adequate bearing contact area. The end of the skirt portion 14 terminates near the adjacent end of the sheathing 10, as shown in Figure 3. The intermediate adapter 13' extends beyond the sleeve 11 and has an outer screw threaded end 15. The adapter 13' is provided inwardly of its screw threaded end 15 with an enlarged hexagonal turning lug 16, integral therewith, and the lug 16 is arranged adjacent to the near end of the rigid sleeve 11. The adapter 13' has a cylindrical bore 17 of lesser diameter than the bore of the skirt portion 14, and the bore 17 leads into an enlarged counter bore or recess 18, formed in the forward screw threaded end of the adapter 13'. A conically beveled shoulder 19 is preferably formed between the bore 17 and counter bore 18, as shown.

A rotary chuck 20 has a reduced cylindrical tubular shank 21 journalled within the bore 17, and the chuck has a forward enlarged portion or head 21' arranged within the counter bore 18 and projecting axially forwardly of the adapter 13', Figure 3. The forward end of the enlarged chuck head 21' is conically tapered at 22, and the chuck head is provided in its forward end with a plurality of circumferentially equidistantly spaced slots 23 extending to points near the longitudinal center of the reduced shank 21, Figure 3. The slots 23 form a plurality of resilient segmental gripping jaws 24, and the chuck 20 has a small cylindrical bore 25 extending throughout its entire length. The enlarged head 21' in the counterbore 18 preferably has its inner end 26 conically tapered for engagement with the conically tapered shoulder 19. The engagement of the shoulder 19 with the tapered end 26 of the chuck head prevents the chuck from moving axially inwardly in the adapter 13'.

A flexible drive shaft or cable 27 has one end firmly secured within the tubular shank 21 of the chuck, and the drive shaft 27 extends through the sleeve 11 and sheathing 10 for connection with the power takeoff of a suitable dental engine, or the like, not shown. The drive shaft 27, as well as the flexible sheathing 10 are of any desired length to suit the convenience of the operator.

A small cylindrical grinding stone or burr 29 has a narrow elongated cylindrical spindle 30 rigidly secured thereto and having its rear end portion engageable within the chuck bore 25, as shown. When the implement is assembled, the rear end of the spindle 30 terminates near the longitudinal center of the chuck bore 25, Figure 3. A tubular clamping nut 32 has screw threaded engagement upon the screw threaded end 15 of adapter 13', and the bore of the nut 32 receives the chuck head 21', as shown. The nut 32 has a reduced opening 33 in its forward end for the passage of the spindle 30, and receiving the forward extremities of the chuck jaws 24. A conically beveled shoulder 34 is formed in the nut 32 inwardly of the reduced opening 33, and when the nut 32 is tightened this shoulder 34 engages the tapered end 22 of the chuck head to force the resilient jaws 24 inwardly for tight clamping engagement with the spindle 30.

I provide an adjustable guard or shield 35 for the rotary burr 29, and this guard comprises a small cylindrical body portion or head 36 surrounding the burr 29 and having its forward end open. A relatively large side opening 38 in the body portion 36 exposes one side of the burr 29, and the side opening 38 extends throughout substantially the entire axial length of the body portion or head 36, as shown. The edges 39 of the head 36 which define the opening 38 are rounded, as shown, so that a forward corner 41 of the burr 29 is fully exposed. The formation of the side opening 38 in the cylindrical head 36 forms upon the head a substantially flat face 41' which is substantially flush with the exposed side of the cylindrical burr 29, Figure 7.

The adjustable guard 35 further comprises a narrow cylindrical sleeve 42, integrally secured to the head 36 and rotatably receiving the spindle 30, and serving as a bearing for this spindle. The sleeve 42 is provided at its rear end with an enlargement or head 42' which bears against the forward end of the clamping nut 32. The bore of the sleeve 42 is just large enough to accommodate the rotary spindle 30, and substantially smaller in diameter than the burr 29. Accordingly, when the spindle 30 is clamped within the chuck 20, the rotary guard 35 cannot shift axially forwardly for any appreciable distance, since the burr 29 cannot enter the small bore of the sleeve 42.

A longitudinal adjusting bar 47 for the rotary guard 35 is provided, and extends adjacent to the clamping nut 32 and turning lug 16 of the adapter 13', as shown. The forward end of the adjusting bar 47 carries a short integral transverse extension 48 which is inwardly directed and rigidly secured by welding or the like to the head 42'. The adjusting bar 47 is spaced somewhat from the sides of the nut 32 and turning lug 16, as shown, for the convenience of the operator. The adjusting bar 47 further comprises an inwardly offset straight longitudinal trailing extension 49, which bears lightly against the periphery of the rubber tube 13 for steadying the adjusting bar 47 as the same is turned circumferentially about the tube 13. By means of the adjusting bar 47, the operator of the implement may readily turn the guard 35 circumferentially about the burr 29 to any selected adjusted position, and the adjustment of the guard 35 may be accomplished with one finger of the hand which holds the implement. When the guard 35 has been shifted to the selected circumferentially adjusted position, the trailing extension 49 is clamped by the fingers against the rubber tube 13, and this serves to hold the guard 35 stationary in the selected adjusted position. I have found it convenient to arrange the transverse attaching extension 48 of the bar 47 at an angle to the side opening 38 and flat face 41' of the guard, as best shown in Figure 4. However, the guard may be adjusted satisfactorily with the extension 48 arranged in any circumferential position with respect to the side opening 38 of the head 36, and the position of the extension 48 in Figure 4 is merely a preferred position.

During the operation of the implement for grinding the small tusks of a chinchilla, the rubber tubing section 13 serves as a handle, and this handle and the flexible sheathing 10 do not rotate. The rotary drive shaft 27 rotates the chuck 20 and intermediate adapter 13' as a unit, along with the clamping unt 32, spindle 30 and burr 29. A rotary holding unit is provided, including the adapter 13' and all elements mounted thereon. The holding unit includes the skirt portion 14, chuck 20 mounted within the adapter and nut 32 to operate the chuck for clamping the spindle 30. The skirt 14 enables the rotary holding unit to be mounted upon and within the sleeve 11 included in the handpiece. The guard 35 is non-rotatable, except for adjustment, and is held stationary by clamping the trailing extension 49 against the handle 13, as previously stated. The clamping nut 32 and adapter 13' are caused to rotate with the drive shaft and chuck 20, due to the wedging engagement of the shoulders 19 and 34 with the tapered parts 26 and 22 of the chuck head 21'. The cylindrical skirt portion 14 of the adapter 13' forms a long bearing within the non-rotatable rigid sleeve 11 for the entire rotating unit of the implement.

The forward end of the implement is introduced into the mouth of the chinchilla, which is held open by suitable means, and the rotary guard 35 is adjusted so that the tusk to be ground may enter the side opening 28 and engage the side of the rotary burr 29. The head or body portion 36 of the guard now protects the mouth of the animal from contact with the burr 29, and the guard is held in the selected adjusted position by clamping the extension 49 against the handle 13 with the fingers. The guard 35 may be adjusted freely for a full 360 degrees about the burr 29 by merely engaging the bar 47 with a finger of the hand holding the implement.

I wish to emphasize that the forward portion of the implement including the sleeve 42 and guard head 36 are extremely narrow or slender, so that the implement may be introduced into the mouth of a chinchilla, which is very small. The adjusting bar 47, clamping nut 32 and other relatively larger parts of the implement are all spaced well rearwardly of the portion of the implement which actually enters the mouth of the chinchilla. The only portion of the implement which will enter the mouth is the head 36, and perhaps a small length of the sleeve 42. The extreme smallness and slenderness of these parts may readily be seen in Figure 10 which is intended to illustrate substantially the actual size of the implement.

It is to be understood that the form of the invention herewith shown and described is to be taken as a preferred example of the same, and that various changes in the shape, size and arrangement of parts may be resorted to, without departing from the spirit of the invention or the scope of the subjoined claims.

Having thus described my invention, what I claim is:

1. A grinding implement comprising a hand piece, a rotary holding unit journalled upon the hand piece, a flexible drive shaft connecting with the holding unit to turn it, a slender spindle held within the holding unit for rotation therewith and extending forwardly of the holding unit, a grinding burr secured to the slender spindle, a sleeve surrounding the slender spindle forwardly of the rotary holding unit and serving as a bearing for the spindle and being slender, a guard carried by the sleeve and partially surrounding the grinding burr and having a side opening for exposing a side of the burr, and an adjusting handle secured to the sleeve rearwardly of said guard and having a part extending adjacent to said hand piece and adapted to be held by the fingers for securing the guard in the selected circumferentially adjusted position relative to the burr.

2. A grinding implement comprising a narrow hand piece, a rotary holding unit journalled upon the hand piece, a flexible drive shaft connected with the holding unit to turn it, a slender spindle held by the holding unit for rotation therewith and extending forwardly of the holding unit, a small grinding burr carried by the forward end of the spindle, a slender sleeve surrounding the spindle forwardly of the holding unit and serving as a bearing for the spindle and having its inner end engaging the forward end of the rotary holding unit, a guard secured to the forward end of the sleeve and surrounding the grinding burr and having an opening in its side for exposing a portion of the burr, and an adjusting handle secured to the sleeve near its end adjacent to said holding unit and extending longitudinally of the hand piece and spaced laterally for a portion of its length from the hand piece, a rear part of the adjusting handle being arranged close to the hand piece and adapted to be clamped thereagainst by the hand holding the hand piece, the adjusting handle, sleeve and guard being adjustable circumferentially of the hand piece and burr for a full 360 degrees.

3. A grinding implement comprising a tube adapted to serve as a handle, a rotary holding unit including a sleeve portion journalled within the tube, a flexible drive shaft leading into the tube and connected with the holding unit to turn the same, a slender spindle gripped by the holding unit and extending longitudinally forwardly of the holding unit, a grinding burr carried by the forward end of the spindle, a guard partially surrounding the grinding burr and having a side opening exposing a side of the burr, a slender sleeve carrying the guard and rotatably receiving the spindle rearwardly of the guard and having a rear end engaging the forward end of the rotary holding unit, a longitudinally extending guard adjusting handle connected with said sleeve near the rear end of the same and spaced a substantial distance rearwardly of the guard, the handle being spaced somewhat laterally of the rotary holding unit and tube serving as a handle and substantially parallel therewith, and a trailing extension carried by the handle and slidably contacting the periphery of the tube serving as a handle and adapted to be clamped thereagainst by the hand holding the implement for positioning the guard in the selected adjusted position.

4. A grinding implement comprising a tube adapted to serve as a handle, an adapter element including a sleeve portion journalled within the tube and having a bore, a gripping chuck mounted within the bore of the adapter element and having jaws projecting forwardly thereof, a flexible drive cable leading into the tube and sleeve portion of said adapter element and secured to said chuck, a clamping member mounted bodily upon said adapter element and being adjustable and engaging the jaws of the chuck forwardly of the adapter element, a slender elongated spindle held by the jaws of the chuck and projecting a substantial distance forwardly of the chuck and clamping member, a grinding burr secured to the forward end of the spindle, the spindle, clamping member, chuck and adapter element forming a rotary unit, a slender sleeve surrounding the spindle forwardly of the clamping member and chuck and having a rear end engaging the clamping member, a guard secured to the forward end of the sleeve and at least partially surrounding the grinding burr, and a longitudinal guard adjusting handle secured to the sleeve near its rear end and extending adjacent to the tube serving as a handle to be held thereagainst when the guard is in a selected adjusted position.

FREDERICK C. FEHRMAN.

References Cited in the file of this patent

UNITED STATES PATENTS

| Number | Name | Date |
|---|---|---|
| 2,012,886 | Lowry | Aug. 27, 1935 |
| 2,429,356 | Hicks | Oct. 21, 1947 |